(12) United States Patent
    Pearce

(10) Patent No.: US 9,531,883 B2
(45) Date of Patent: Dec. 27, 2016

(54) PROVIDING AN ANNOUNCEMENT FOR A MULTIPARTY COMMUNICATION SESSION

(71) Applicant: Cisco Technology, Inc., San Jose, CA (US)

(72) Inventor: Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 37 days.

(21) Appl. No.: 14/728,691

(22) Filed: Jun. 2, 2015

(65) Prior Publication Data

US 2015/0264186 A1    Sep. 17, 2015

Related U.S. Application Data

(63) Continuation of application No. 11/342,124, filed on Jan. 27, 2006, now Pat. No. 9,065,664.

(51) Int. Cl.
    *H04M 3/56*     (2006.01)
    *H04W 4/08*     (2009.01)
    *H04L 12/18*    (2006.01)

(52) U.S. Cl.
    CPC .......... *H04M 3/568* (2013.01); *H04L 12/1818* (2013.01)

(58) Field of Classification Search
    CPC ... H04L 12/1818; H04M 3/567; H04M 3/568; H04M 2203/5009
    USPC ...................................................... 370/260
    See application file for complete search history.

(56) References Cited

U.S. PATENT DOCUMENTS

| | | | |
|---|---|---|---|
| 6,728,356 B1* | 4/2004 | Carroll | H04M 3/56 379/201.01 |
| 6,781,963 B2 | 8/2004 | Crockett et al. | |
| 6,873,854 B2* | 3/2005 | Crockett | H04M 3/56 370/260 |
| 6,898,436 B2 | 5/2005 | Crockett et al. | |
| 7,221,660 B1 | 5/2007 | Simonson et al. | |
| 2002/0133611 A1 | 9/2002 | Gorsuch et al. | |
| 2003/0152040 A1 | 8/2003 | Crockett et al. | |
| 2003/0153339 A1 | 8/2003 | Crockett et al. | |
| 2003/0153340 A1 | 8/2003 | Crockett et al. | |

OTHER PUBLICATIONS

"Ventrilo, Surround Sound Voice Communication Software", http://www.ventrilo.com/about.php, © Flagship Industries, Inc., 15 pages, Printed Dec. 21, 2005.
"TeamSpeak Communication System, About", http://www.goteamspeak.com/index.php?page=about, © 2004-2005 by TeamSpeak Systems, 2 pages, Printed Dec. 21, 2005.

(Continued)

*Primary Examiner* — Parth Patel
*Assistant Examiner* — Jason Harley
(74) *Attorney, Agent, or Firm* — Baker Botts L.L.P.

(57) ABSTRACT

Providing an announcement for a multiparty communication session involves establishing a communication session between at least two endpoints. A request to add an added endpoint to the communication session is received. A procedure to provide an announcement to the endpoints of the communication session is initiated. The announcement is played in response to determining a status of a media path of the added endpoint, and is provided from a rendering of a participant identifier associated with the added endpoint.

19 Claims, 2 Drawing Sheets

(56) References Cited

OTHER PUBLICATIONS

"*TeamSpeak Communication System, Screenshots*", http://www.goteamspeak.com/index.php?page=screenshots, © 2004-2005 by TeamSpeak Systems, 2 pages, Printed Dec. 21, 2005.
"*TeamSpeak Communication System, Features*", http://www.goteamspeak.com/index.php?page=features, © 2004-2005 by TeamSpeak Systems, 2 pages Printed Dec. 21, 2005.
"*Cisco Meeting Place 8112 Rich-Media Conferencing on Every Desktop*", Data Sheet, © Cisco Systems, Inc., http://www.cisco.com/en/US/products/sw/ps5664/ps5669/products_data_sheet, 5 pages, Printed Dec. 21, 2005.

\* cited by examiner

PROVIDING AN ANNOUNCEMENT FOR A MULTIPARTY COMMUNICATION SESSION

RELATED APPLICATION

This application is a continuation under 35 U.S.C. §120, of U.S. patent application Ser. No. 11/342,124, filed Jan. 27, 2006, and entitled "Providing an Announcement for a Multiparty Communication Session," which is herein incorporated by reference.

TECHNICAL FIELD

This invention relates generally to the field of telecommunications and more specifically to providing an announcement for a multiparty communication session.

BACKGROUND

A communication session among endpoints may involve a conference bridge. Each endpoint sends a stream of information to the conference bridge. The conference bridge mixes the streams and transmits the mixed streams back to the endpoints to distribute the information.

The endpoints participating in the communication session may be identified to the other endpoints of the session. Known techniques for identifying the endpoints include announcing identifiers of the users of the endpoints. These known techniques, however, are not satisfactory in certain situations. It is generally desirable to have satisfactory techniques in certain situations.

SUMMARY OF THE DISCLOSURE

In accordance with the present invention, disadvantages and problems associated with previous techniques for providing an announcement for a multiparty communication session may be reduced or eliminated.

According to one embodiment of the present invention, providing an announcement for a multiparty communication session involves establishing a communication session between at least two endpoints. A request to add an added endpoint to the communication session is received. A procedure to provide an announcement to the endpoints of the communication session is initiated. The announcement is played in response to determining a status of a media path of the added endpoint, and is provided from a rendering of a participant identifier associated with the added endpoint.

Certain embodiments of the invention may provide one or more technical advantages. A technical advantage of one embodiment may be that an identifier of an endpoint that is added to an already established communication session may be announced to the other endpoints of the communication session. The request to add the endpoint may be made after the communication session has been established.

Another technical advantage of one embodiment may be that the announcement may be provided in a system with a conference controller located at any suitable device. For example, the conference controller may be located at the endpoint or at a call agent. Another technical advantage of one embodiment may be that the announcer may be provided by any suitable device. For example, the announcement may be provided by the endpoint, a mixer, or a call agent.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
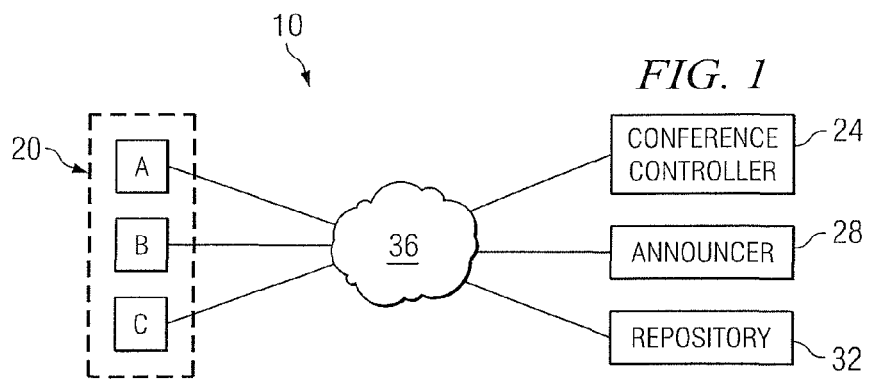
FIG. 1 is a block diagram illustrating one embodiment of a system for providing an announcement for a multiparty communication session.

FIG. 1 is a block diagram illustrating one embodiment of a system 10 for providing an announcement for a multiparty communication session. System 10 may announce the identifier of an endpoint 20 that is added to an already established communication session. The request to add endpoint 20 may be made after the communication session has been established.

According to one embodiment, system 10 operates to provide services, such as multiparty communication sessions, to endpoints 20. A communication session may refer to an active communication between endpoints 20, measured from endpoint 20 to endpoint 20. A multiparty communication session may refer to a communication session that involves two or more endpoints 20, for example, a conference call that involves more than two endpoints 20. A participant in a communication session may refer to an endpoint 20 participating in the session, a user of endpoint 20, or a combination of endpoint 20 and the user.

A multiparty communication session may be prescheduled or ad hoc. In a prescheduled multiparty communication session, session resources are reserved prior to establishing the communication session. Participants are invited to dial into the communication session. In an ad hoc multiparty communication session, an added endpoint 20 is requested to be added to a communication session after the communication session has been established between at least two endpoints 20. Typically, an initiator endpoint 20 place a call to added endpoint 20 and indicates that added endpoint 20 should be bridged into the communication session.

During a communication session, information may be communicated as a stream. A stream may refer to a flow of information organized in packets. Information may refer to voice, data, text, audio, video, multimedia, control, signaling, other information, or any combination of the preceding. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 may utilize communication protocols and technologies to provide the communication sessions. Example communication protocols and technologies include those set by the Institute of Electrical and Electronics Engineers, Inc. (IEEE) 802.xx standards such as 802.11 and 802.16 standards, the International Telecommunications Union (ITU-T) standards, the European Telecommunications Standards Institute (ETSI) standards, the Internet Engineering Task Force (IETF) standards, or other standards.

System 10 includes components such as devices. In general, a device may include any suitable arrangement of components operable to perform the operations of the device, and may comprise logic such as hardware, software, other logic, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes endpoints 20, a conference controller 24, an announcer 28, a repository 32, and a network 36 coupled as shown. According to one example of operation, endpoint A calls endpoint B, and then endpoint A adds endpoint C. Conference controller 24 manages the setup of the multiparty communication session. A rendering of an identifier of the participant associated with endpoint C is retrieved from repository 32. Announcer 28 provide an announcement using the rendering.

Endpoint 20 represents any suitable device operable to communicate with a communication system. Endpoint 20 may comprise, for example, a personal digital assistant, a computer such as a laptop, a cellular telephone, a mobile handset, or any other device operable to communicate with system 10.

A participant corresponding to endpoint 20 may refer to endpoint 20 itself operating as a participant, the user of endpoint 20, or a combination of endpoint. 20 and the user. A participant may be identified based on any suitable identifier such as an endpoint identifier or a user identifier. An endpoint identifier identifies an endpoint 20, and may comprise, for example, a telephone number, an Internet Protocol (IP) address, other suitable identifier, or any combination of the preceding. A user identifier identifies a user, and may comprise, for example, a user name.

One or more packets of a stream from endpoint 20 may include a participant identifier of endpoint 20. For example, packets from endpoint 20 may include the IP address of endpoint 20. According to one embodiment, the participant identifier included in the stream may be used for an announcement. For example, a telephone number may be used. According to another embodiment, the participant identifier used in the announcement may be derived from the participant identifier in the stream. For example, a name used in the announcement may be derived from an IP address in the stream.

Conference controller 24 manages multiparty communication sessions between endpoints 20. Conference controller 24 may comprise a conference manager application that operates as a controller and a rendezvous point for multiparty communication sessions. The application manages the insertion of calls into a multiparty communication session and termination of calls from the multiparty communication session. Conference and scheduling resources such as conference bridges may be allocated by the application.

Conference controller 24 may perform other suitable operations. As an example, conference controller 24 may receive requests to speak and grant permission to speak. If multiple requests are received, conference controller may decide the one or more requests that may be granted. The decision may be based on a conference policy, for example, a first-come, first-serve policy, a round robin policy, a priority-based policy, or any other suitable policy. As another example, conference controller 24 may determine the capabilities, locations, and regions of endpoints 20.

Conference controller 24 may be provided at any suitable device. Example devices are described in association with FIGS. 2 through 4.

Announcer 28 announces participant identifiers associated with endpoints 20 added to a communication session. According to one embodiment, announcer 28 retrieves a rendering of the participant identifier from repository 32, and provides the announcement using the rendering. Announcer 28 may be provided at any suitable device. Example devices are described in association with FIGS. 2 through 4.

Repository 32 stores renderings of participant identifiers. A rendering of a participant identifier may refer to an embodiment of the identifier that allows announcer 28 to announce the participant identifier. As an example, a rendering may include an audio, textual, video, or other rendering of an identifier.

A rendering may be generated at any suitable manner at any suitable time. As an example, a rendering may comprise an audio recording of the participant identifier recorded prior to or during the communication session. An audio rendering may be made available through the Voice Profile for Internet Mail (VPIM) protocol. As another example, an audio rendering may be generated from a textual rendering using a text-to-speech engine. The textual rendering of a participant identifier may comprise any suitable characters, for example, numbers or letters. The text-to-speech engine may reside in any suitable location, for example, at endpoint 20 or call agent or in a separate device available to endpoint 20 or call agent 54.

Repository 32 may be provided at any suitable device. Example devices are described in association with FIGS. 2 through 4.

Network 36 represents a communication network that allows devices such as endpoint 20 to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. As an example, system 10 may be incorporated with traditional or voice over IP (VoIP) private branch exchanges (PBXs).

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

Figure 2:
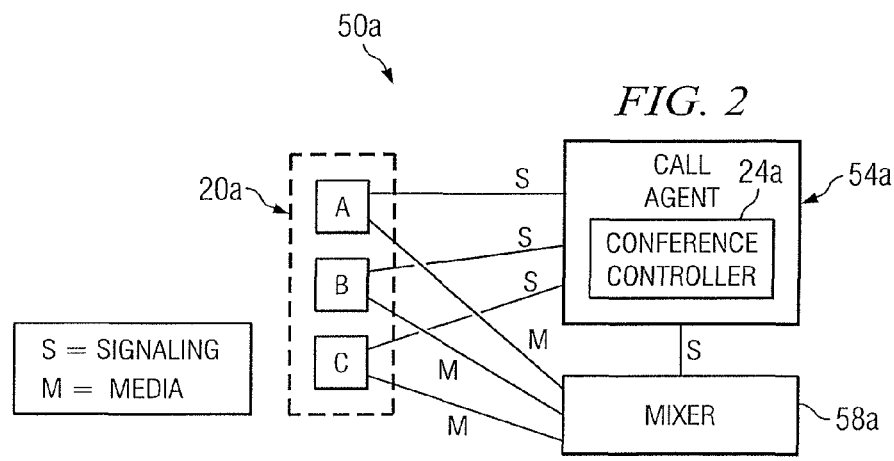
FIGS. 2 through 4 are block diagrams illustrating examples of systems that may be used to perform the operations of the system of FIG. 1.
Figure 3:
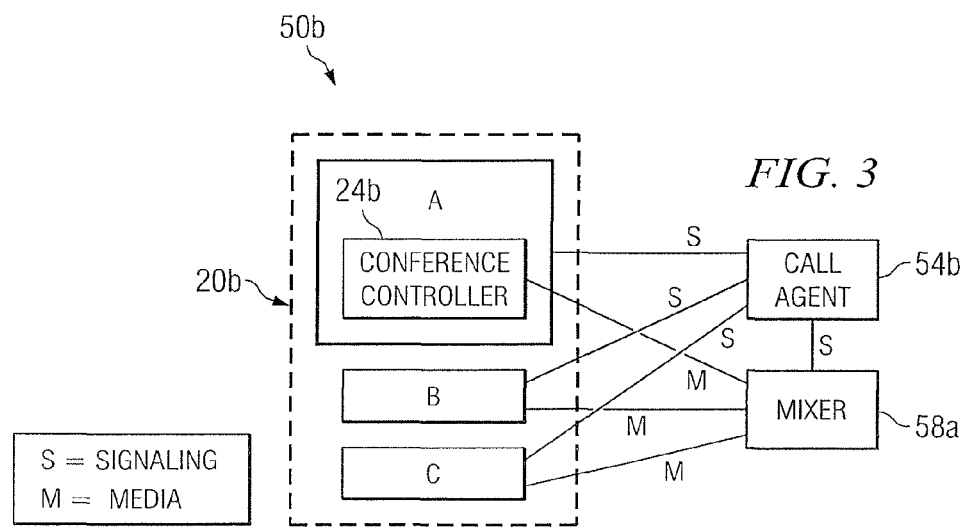
Figure 4:
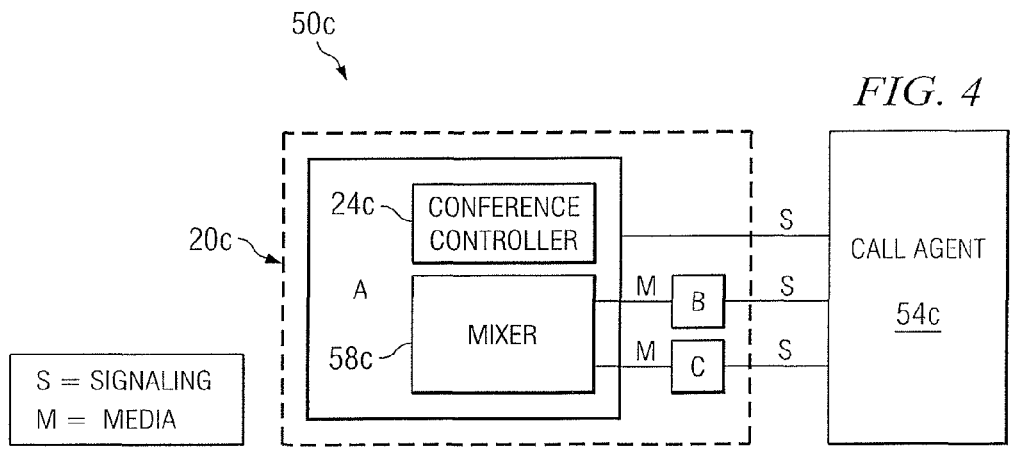

FIGS. 2 through 4 are block diagrams illustrating examples of systems 50 that may be used to perform the operations of system 10. According to the illustrated examples, each system 50 include endpoints 20, a call agent 54, and a mixer 58. According to one example of operation, endpoint A calls endpoint B, and then endpoint A adds endpoint C.

Call agent 54 manages signaling for communication sessions. As an example, call agent 54 may manage call signaling and media control signaling. According to one embodiment, call agent 54 facilitates a communication session between endpoints A and B. Call agent 54 receives a conference request from endpoint A to add endpoint C to the communication session. Call agent 54 sends an invitation to the communication session to endpoint C. If endpoint C can accept the call, endpoint C sends an acceptance to call agent 54. When the call is answered at endpoint C, call agent 54 instructs endpoints A, B, and C to send streams to mixer 58, and tells mixer 58 to expect the streams.

Mixer 58 manages media exchange between endpoints 20. Mixer 58 receives streams from endpoints 20, mixes the streams to form mixed streams, and sends the mixed streams to endpoints 20. Mixer 58 may include summers or other suitable signal processing resources each operable to sum, add, or otherwise combine input streams into mixed streams. Mixer 58 may also include input and output transcoders. An input transcoder receives a stream from endpoint 20 and transcodes the stream from a compressed format of endpoint 20 to an uncompressed format of mixer 58 for processing in mixer 58. An output transcoder receives mixed streams in an uncompressed format and transcodes the conference output streams into a compressed format of endpoint 20.

FIG. 2 is a block diagram illustrating one example of a system 50a that may perform the operations of system 10 of FIG. 1. According to the example, system 50a includes endpoints 20a, a call agent 54a, and a mixer 58a coupled as shown. According to the example, call agent 54a includes conference controller 24.

FIG. 3 is a block diagram illustrating one example of a system 50b that may perform the operations of system of FIG. 1. According to the example, system 50b includes endpoints 20b, a call agent 54b, and a mixer 58b coupled as shown. According to the example, an endpoint A includes conference controller 24b.

FIG. 4 is a block diagram illustrating one example of a system 50c that may perform the operations of system 10 of FIG. 1. According to the example, system 50c includes endpoints 20c, a call agent 54c, and a mixer 58c coupled as shown. According to the example, endpoint A includes conference creator 24c and mixer 58c.

Referring to FIGS. 2 through 4, repository 32 may be located at any suitable device. According to a first embodiment, repository 32 may be located at endpoint 20. A rendering may be stored in an endpoint-based profile or in objects created when a communication session is established. According to a second embodiment, repository 32 may be located at call agent 54. A rendering may be stored in objects created at call agent 54 when a communication session is established. According to a third embodiment, repository 32 may be located in a database or a file server. The database may comprise a call agent database for storing endpoint information. The file server may comprise a call agent file server or a voicemail file server.

Announcer 28 may retrieve a rendering from repository 32 in any suitable manner. According to one embodiment, announcer 28 may play a stored rendering. As a first example, announcer 28 may retrieve a speech file stored with announcer 28, and then play the speech file. As a second example, announcer 28 may retrieve a speech file from a file server based on a participant identifier, and then play the speech file.

According to another embodiment, announcer 28 may utilize a text-to-speech operation. As a first example, announcer 28 may call a text-to-speech function to translate a textual rendering to an audio rendering, and then play the audio rendering. As a second example, announcer 28 may provide an identifier to a text-to-speech server, which provides an audio file based on the identifier. Announcer 28 plays the audio file.

Referring to FIGS. 2 through 4, any suitable device may operate as announcer 28. According to a first embodiment, added endpoint C may operate as an announcer 28. In the first embodiment, endpoint C receives an instruction from conference controller 24 to send a stream to mixer 58 and then play an announcement to conference controller 24. If conference controller 24 does not receive an announcement, then conference controller 24 may infer that a valid media path has not been established.

According to a second embodiment, mixer 58 may operate as announcer 28. In the second embodiment, mixer 58 plays the announcement of the rendering for endpoint C. Mixer 58 may directly or indirectly determine whether there is a valid media path using a valid media path indication. A valid media path indication may comprise, for example, a media packet, a silence RTP packet, or a signal notification from a device indicating that endpoint C has a valid media path.

In certain situations, mixer 58 may directly determine that there is a valid media path when mixer 58 receives packets from endpoint C. For example, a valid media path may be established if packets, such as media packets or silence packets, are received. A silence packet may be used to ensure that a firewall keeps the path open for an endpoint.

In other situations, however, mixer 58 may not be able to directly determine whether there is a valid path. For example, a silence suppression function may be enabled such that no packets are sent if there is no audio activity from endpoint 20. In this situation, mixer 58 may indirectly determine that a valid media path has been established from a signal notification from a device indicating that endpoint C has a valid media path.

According to a third embodiment, conference creator endpoint A may operate as announcer 28. Endpoint A may be able to directly or indirectly determine if the media path for endpoint C is valid as described previously.

Figure 5:
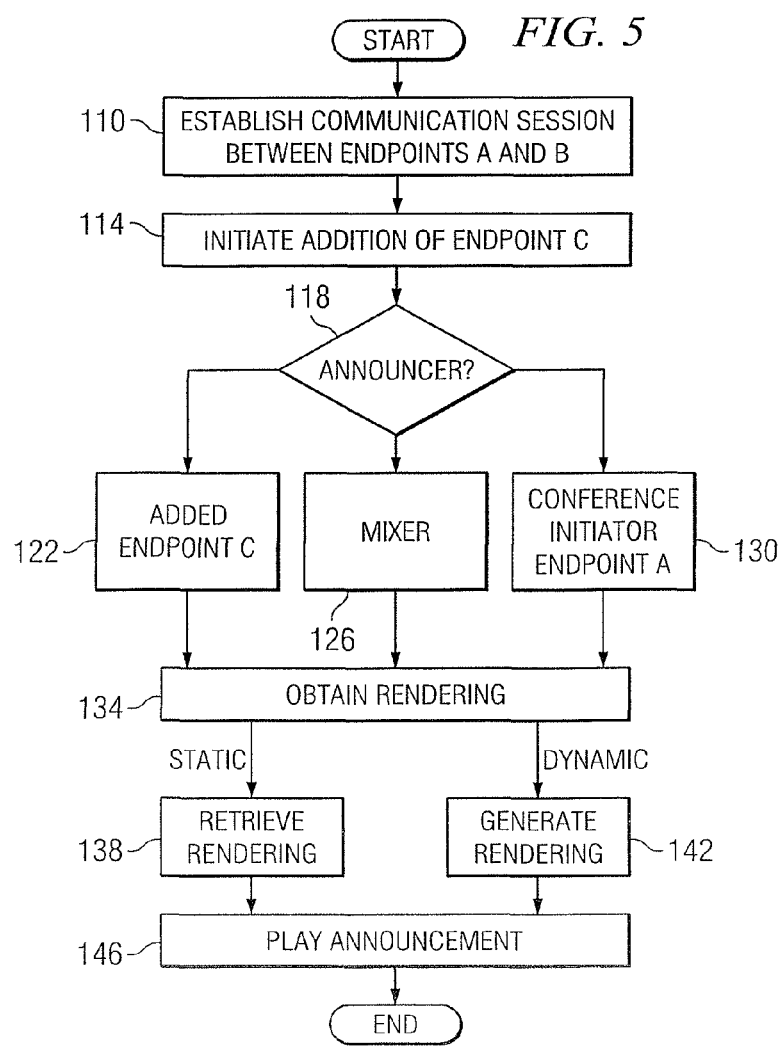
FIG. 5 is a flowchart illustrating one embodiment of providing an announcement for a multiparty communication session.

FIG. 5 is a flowchart illustrating one embodiment of providing an announcement for a multiparty communication session. The method may be used with any suitable systems 50 operable to perform the operations of system 10. For example, the method may be used with example systems 50 of FIGS. 2 through 4 operable to perform the operations of system 10 of FIG. 1.

The method begins at step 110, where a communication session is established between endpoints A and B. Endpoint C may be added to the communication session. Conference creator endpoint A initializes addition of endpoint C at step 114. Any suitable device may operate as an announcer 28 at step 118. As an example, added endpoint C, mixer 50, or conference controller 24 may operate as an announcer 28.

If added endpoint C is operating as announcer 28 at step 118, the method proceeds to step 122. Endpoint C may operate as announcer 28 at step 122 in any suitable manner. As a first example, in system 50a of FIG. 2, call controller 24a located at call agent 54a may instruct endpoints B and C to provide announcements after connecting to mixer 58a. An endpoint 20 may provide the announcements by placing a rendering in the media path. The instructions may tell endpoint 20 to provide announcements in any suitable manner, for example, sequentially.

As a second example, in system 50b of FIG. 3, conference controller 24b located at endpoint A may instruct endpoints B and C to provide announcements after connecting to mixer 58a. The instructions may be embedded in messages that refer endpoints B and C to mixer 58b. Conference controller 24b may organize the instructions to control the order in which the announcements are provided. The method then proceeds to step 134.

If mixer 58 is operating as announcer 28 at step 118, the method proceeds to step 126. Mixer 58 may provide the announcement at step 126 in any suitable manner. As an example, conference controller 24 may instruct mixer 58 to provide the announcement. The announcement may be provided in response to directly or indirectly determining that a valid media path for endpoint C has been established. The method then proceeds to step 134.

If conference initiator A is operating as announcer 28 at step 118, the method proceeds to step 130. Conference initiator A may provide the announcement at step 130 in any suitable manner. The announcement may be provided in response to directly or indirectly determining that a valid media path for endpoint C has been established. The method then proceeds to step 134.

Announcer 28 obtains a rendering of a participant identifier for endpoint C at step 134. The rendering allows announcer 28 to announce the participant identifier. The rendering may be obtained in any suitable manner, for example, a static or dynamic manner. If the rendering is to be obtained in a static manner, the method proceeds to step 138, where announcer 28 retrieves the rendering from repository 32. Repository 32 may be located at endpoint 20 or conference controller 24. The method then proceeds to step 146.

If the rendering is to be obtained in a dynamic manner at step 134, the method proceeds to step 142, where the rendering is dynamically generated. The rendering may be dynamically generated in any suitable manner. For example, announcer 28 may utilize a text-to-speech operation to dynamically generate the rendering. The method then proceeds to step 146.

The announcement is played at step 146. The announcement may identify endpoint C added to the multiparty communication session. After playing the announcement, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that an identifier of an endpoint that is added to an already established communication session may be announced to the other endpoints of the communication session. The request to add the endpoint may be made after the communication session has been established.

Another technical advantage of one embodiment may be that the announcement may be provided in a system with a conference controller located at any suitable device. For example, the conference controller may be located at the endpoint or at a call agent. Another technical advantage of one embodiment may be that the announcer may be provided by any suitable device. For example, the announcement may be provided by the endpoint, a mixer, or a call agent.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for announcing a joined party in a multiparty communication session, comprising:
   establishing, by a conference controller, a communication session between at least a first endpoint and a second endpoint;
   receiving, by the conference controller, a request to add a third endpoint to the communication session;
   determining that a media path for the third endpoint is valid; and
   initiating, by the conference controller, a procedure to have the third endpoint to retrieve an audio rendering of the participant identifier and provide an audio announcement announcing a participant identifier of the third endpoint to the at least first and second endpoints of the communication session in response to determining that the media path of the third endpoint is valid, the announcement provided from the audio rendering of the participant identifier associated with the third endpoint, and wherein initiating the procedure to provide the announcement to the at least first and second endpoints of the communication session further comprises:
   instructing the third endpoint to provide the announcement after sending a stream over the media path.

2. The method of claim 1, wherein the media path for the added endpoint is determined to be valid according to a valid media path indicator.

3. The method of claim 1, further comprising:
   establishing the participant identifier from the request; and
   obtaining the rendering of the announcement from a repository in accordance with the participant identifier.

4. The method of claim 1, further comprising:
   establishing the participant identifier from the request; and
   generating the rendering in accordance with the participant identifier.

5. The method of claim 1, further comprising:
   establishing an identifier from the request; and
   deriving the participant identifier from the established identifier.

6. A system for providing an announcement for a multiparty communication session, comprising:
   an interface operable to communicate with at least a plurality of endpoints; and one or more first processors operable to:
   establish a communication session between at least a first endpoint and a second endpoint;
   receive a request to add a third endpoint to the communication session;
   determine that a media path for the third endpoint is valid according to a valid media path indicator; and
   initiate a procedure to have the third endpoint retrieve an audio rendering of the participant identifier and provide an audio announcement announcing a participant identifier of the third endpoint to the at least first and second endpoints of the communication session in response to determining that the media path of the third endpoint is valid, the announcement provided from the audio rendering of the participant identifier associated with the third endpoint, wherein initiating the procedure to provide the audio announcement to the first and second endpoints of the communication session comprises instructing the third endpoint to provide the audio announcement comprising the audio rendering after sending a stream over the media path.

7. The system of claim 6, further comprising one or more second processors operable to:
   determine that the media path for the added endpoint is valid according to a valid media path indicator.

8. The system of claim 6, further comprising one or more second processors operable to:
   establish the participant identifier from the request; and
   obtain the rendering of the announcement from a repository in accordance with the participant identifier.

9. The system of claim 6, further comprising one or more second processors operable to:
   establish the participant identifier from the request; and
   generate the rendering in accordance with the participant identifier.

10. The system of claim 6, further comprising one or more second processors operable to:
    establish an identifier from the request; and
    derive the participant identifier from the established identifier.

11. The system of claim 6, the one or more first processors further operable to:
    initiate the procedure to provide the audio announcement to the first and second endpoints of the communication session by:
       determining that the media path for the third endpoint is valid according to a valid media path indicator; and
       instructing the third endpoint to provide the audio announcement after sending a stream over the media path.

12. The system of claim 6, further comprising one or more second processors operable to:
    establish an identifier from the request; and
    obtain the rendering of the audio announcement from a memory in accordance with the identifier;
    generate the audio rendering in accordance with the identifier; and
    derive the participant identifier from the identifier.

13. A system for providing an announcement for a multiparty communication session, comprising:
    a conference controller operable to:
       establish a communication session between at least a first endpoint and a second endpoint;
       receive a request to add a third endpoint to the communication session;
       determine that a media path for the third endpoint is valid according to a valid media path indicator; and
       initiate a procedure to have the third endpoint retrieve an audio rendering of the participant identifier and provide an audio announcement announcing the participant identifier of the added endpoint to the endpoints of the communication session in response to determining that the media path of the third endpoint is valid, the announcement provided from the audio rendering of the participant identifier associated with the third endpoint, and wherein initiating the procedure to provide the audio announcement to the first and second endpoints of the communication session comprises instructing the third endpoint to provide the audio announcement comprising the audio rendering after sending a stream over the media path.

14. The system of claim 13, the conference controller further operable to:
    determine that the media path for the third endpoint is valid according to a valid media path indicator.

15. The system of claim 13, the conference controller further operable to:
    establish the participant identifier from the request; and
    obtain the rendering of the audio announcement from a repository in accordance with the participant identifier.

16. The system of claim 13, the conference controller further operable to:
    establish the participant identifier from the request; and
    generate the audio rendering in accordance with the participant identifier.

17. The system of claim 14, the conference controller further operable to:
    establish an identifier from the request; and
    derive the participant identifier from the established identifier.

18. The system of claim 14, wherein:
    the conference controller is further operable to initiate a procedure to provide the audio announcement to the first and second endpoints of the communication session by:
       instructing the third endpoint to provide the audio announcement after sending a stream over the media path; and
    the conference controller is further operable to:
       determine that the media path for the third endpoint is valid according to a valid media path indicator;
       establish an identifier from the request;
       obtain the audio rendering of the audio announcement from a memory in accordance with the identifier;
       generate the audio rendering in accordance with the identifier; and
       derive the participant identifier from the identifier.

19. A system for providing an announcement for a multiparty communication session, comprising:
    means for establishing, by one or more first processors, a communication session between at least a first endpoint and a second endpoint;
    means for receiving, by the one or more first processors, a request to add a third endpoint to the communication session;
    means for determining, by the one or more first processors, that a media path for the third endpoint is valid according to a valid media path indicator; and
    means for initiating, by the one or more first processors, a procedure to have the third endpoint retrieve an audio rendering of the and provide an audio announcement announcing the participant identifier of the third endpoint to the first and second endpoints of the communication session in response to determining that the media path of the third endpoint is valid, the announcement provided from the audio rendering of the participant identifier associated with the third endpoint, and
wherein means for initiating the procedure to provide the audio announcement to the first and second endpoints of the communication session comprises:
means for instructing the third endpoint to provide the audio announcement comprising the audio rendering after sending a stream over the media path.

\* \* \* \* \*